United States Patent
Bolte et al.

(10) Patent No.: US 8,096,860 B2
(45) Date of Patent: Jan. 17, 2012

(54) AUTOMATED MEAT BREAKING SYSTEM AND METHOD

(75) Inventors: Tom A. Bolte, Columbus, NE (US); David R. McKenna, Benton, KS (US)

(73) Assignee: Cargill, Incorporated, Wayzata, MN (US)

( * ) Notice: Subject to any disclaimer, the term of this patent is extended or adjusted under 35 U.S.C. 154(b) by 51 days.

(21) Appl. No.: 12/787,740

(22) Filed: May 26, 2010

(65) Prior Publication Data

US 2010/0304652 A1    Dec. 2, 2010

Related U.S. Application Data

(60) Provisional application No. 61/182,255, filed on May 29, 2009.

(51) Int. Cl.
*A22C 25/00* (2006.01)
(52) U.S. Cl. ...................................................... 452/157
(58) Field of Classification Search .................. 452/136, 452/148, 149–158, 160, 166, 170
See application file for complete search history.

(56) References Cited

U.S. PATENT DOCUMENTS

| | | | | |
|---|---|---|---|---|
| RE26,664 | E  * | 9/1969 | Noumi | 318/400.39 |
| 3,546,737 | A  * | 12/1970 | Doerfer et al. | 452/157 |
| 3,916,484 | A | 11/1975 | Kennedy | |
| 3,982,299 | A  * | 9/1976 | Kompan | 452/157 |
| 4,134,181 | A | 1/1979 | Schneider, Jr. | |
| 4,160,320 | A  * | 7/1979 | Wikoff | 30/380 |
| 4,246,837 | A  * | 1/1981 | Chenery | 452/134 |
| 4,628,569 | A  * | 12/1986 | Gagliardi, Jr. | 452/166 |
| 5,205,779 | A | 4/1993 | O'Brien et al. | |
| 5,211,600 | A  * | 5/1993 | Passchier | 452/171 |
| 5,314,375 | A  * | 5/1994 | O'Brien et al. | 452/157 |
| 5,358,441 | A  * | 10/1994 | Hjorth | 452/180 |
| 5,725,424 | A  * | 3/1998 | Dufour et al. | 452/160 |
| 5,727,997 | A  * | 3/1998 | Dufour et al. | 452/170 |
| 5,944,598 | A | 8/1999 | Tong et al. | |
| 6,155,919 | A  * | 12/2000 | Haagensen et al. | 452/171 |
| 6,547,658 | B2 * | 4/2003 | Boody et al. | 452/171 |
| 6,563,904 | B2 * | 5/2003 | Wijts et al. | 378/58 |
| 6,860,804 | B2 | 3/2005 | Kruger | |
| 6,891,961 | B2 | 5/2005 | Eger et al. | |
| 6,994,617 | B2 * | 2/2006 | Jakobsen et al. | 452/161 |
| 7,052,388 | B2 | 5/2006 | Houtz | |
| 7,153,203 | B2 * | 12/2006 | Pfarr et al. | 452/150 |

FOREIGN PATENT DOCUMENTS

| | | |
|---|---|---|
| EP | 07/14607 | 6/1996 |
| WO | 03/032739 | 4/2003 |
| WO | 2007/041590 | 4/2007 |
| WO | 2007/053856 | 5/2007 |

* cited by examiner

*Primary Examiner* — Richard Price, Jr.

(57) ABSTRACT

An automated system and method for breaking a primal cut of meat into smaller components includes a conveyor for advancing the primal cut from a first end of the system to a second end of the system, at least one automated cutting assembly for performing a first cut and a second cut to separate the primal cut into three sub-components, and a guide for orienting the primal cut on the conveyor. In some embodiments, the guide is configured to align with a spinal groove in the primal cut. In some embodiments, the at least one automated cutting assembly includes a first automated cutting assembly for performing the first cut and a second automated cutting assembly for performing the second cut.

28 Claims, 13 Drawing Sheets

AUTOMATED MEAT BREAKING SYSTEM AND METHOD

CROSS REFERENCE TO RELATED APPLICATION

This application claims priority from U.S. Application Ser. No. 61/182,255 filed May 29, 2009 and is incorporated by reference in its entirety herein.

TECHNICAL FIELD

This invention relates to an automated system and method for breaking meat, and more particularly to an automated system and method for separating portions of a primal cut of meat into sub-components.

BACKGROUND

In conventional meat processing operations, cuts of meat removed from the rib and loin of a slaughtered animal, including beef, pork and lamb, may be fabricated into various bone-in and boneless meat products. For example, a primal cut of beef having rib, plate and navel sections is typically broken down or separated into a rib, a plate and a navel. Commonly the locations of the separations on the primal cut are based on anatomical markers and/or length measurements that result in the components (rib, plate and navel) matching a product specification.

The separation or breaking may commonly be performed by suspending the carcass overhead and then using a hand-held circular-type saw to make the cuts or breaks. Alternatively, the cuts may be made by placing the carcass on a flat surface and then using a band saw to make the cuts. In both cases, the cuts are typically made with the internal rib cage of the carcass facing the operator. In any case, all of the cuts rely upon human interaction and a human assessment of where to make the cuts.

Making the cuts or breaks manually is time consuming, labor intensive, and creates potential worker safety challenges. Moreover, these manual processes often result in variability in the cuts from carcass to carcass.

SUMMARY

This disclosure is directed to an automated system and method of breaking primal cuts of meat into sub-components. In one embodiment, a method of separating a forequarter of meat to form a rib and a chuck includes positioning the forequarter at a first end of an automated system, moving the forequarter towards a second end of the automated system, performing a first cut on the forequarter to remove a navel and a brisket bone from the forequarter, and performing a second cut on the forequarter to remove a plate short ribs and a chuck short ribs from the forequarter to form a remaining portion of the forequarter, which includes a rib and a chuck. The first cut and the second cut are performed using at least one automated cutting assembly.

In some aspects, a location of the second cut is based on a location of a chine bone on the forequarter. In some aspects, an imaging assembly determines the location of the chine bone. In some aspects, moving the forequarter towards a second end of the automated system includes aligning a spinal groove of the forequarter with a protrusion oriented in a direction parallel to a direction of movement of a conveyor on the system.

In some aspects, the at least one automated cutting assembly includes a first automated cutting assembly and a second automated cutting assembly. In some aspects, the first automated cutting assembly is a circular saw or a band saw. In some aspects, the second automated cutting assembly is a band saw.

In another embodiment, a method of separating a wing section of beef to form a rib, a plate, and a navel includes positioning the wing section at one end of an automated system, directing the wing section towards a first automated cutting assembly configured for a first cutting path, separating the navel from the rib and the plate by conveying the wing section through the first cutting path, directing the wing section towards a second automated cutting assembly configured for a second cutting path, and separating the plate from the rib by conveying the wing section through the second cutting path.

In some aspects, the second cutting path is determined as a function of a location of the chine bone on the conveyor. In some aspects, determining the location of the chine bone is performed by an imaging system. In some aspects, the method of separating the wing section of beef includes adjusting at least one of the first automated cutting assembly and the second automated cutting assembly as a function of the location of the chine bone.

In another embodiment, a system for cutting a primal of meat that includes a rib, a plate and a navel includes a conveyor for advancing the primal of meat, at least one automated cutting assembly for performing a first cut to separate the navel from the plate and the rib and a second cut to separate the plate from the rib, and a guide for orienting the primal of meat on the conveyor.

In some aspects, the guide for orienting the primal of meat is a protrusion configured to align with a spinal groove in the primal of meat. The protrusion is oriented in parallel with a direction of movement of the conveyor.

In some aspects, the system includes a backstop configured to contact a trailing edge of the primal of meat and prevent the primal of meat from traveling in a direction opposite to a direction of movement of the conveyor.

In some aspects, the at least one automated cutting assembly of the system includes a first automated cutting assembly for performing the first cut and a second automated cutting assembly for performing the second cut. In some aspects, the first automated cutting assembly is a circular saw or a band saw. In some aspects, the second automated cutting assembly is a band saw. In some aspects, the system further includes a support rail and/or a pressurized belt, both of which are configured for stabilizing the primal of meat on the conveyor.

In some aspects, the system includes an imaging system for determining a physical characteristic on the primal of meat. In some aspects, the system includes a control system for adjusting the at least one automated cutting assembly as a function of the physical characteristic on the primal of meat.

In yet another embodiment, a system for separating a wing section of beef into a rib, a plate and a navel includes a conveyor configured to move the wing section from a first end of the system to a second end of the system, an orientation device to align the wing section on the conveyor, an advancement device configured to contact a trailing edge of the wing section and prevent the wing section from moving in a direction opposite to a direction of movement by the conveyor, a first automated cutting assembly configured to perform a first cut to separate the navel from the plate and the rib, and a second automated cutting assembly configured to perform a second cut to separate the plate from the rib.

In some aspects, the first automated cutting assembly is a circular saw or a band saw. In some aspects, the second automated cutting assembly is a band saw. In some aspects, the orientation device is a protrusion that runs essentially a length of the conveyor, and the protrusion is configured to engage with a spinal groove on the wing section.

The details of one or more embodiments of the invention are set forth in the accompanying drawings and the description below. Other features, objects, and advantages of the invention will be apparent from the drawings and detailed description, and from the claims.

DETAILED DESCRIPTION

This disclosure provides for an automated system and method of breaking meat. In some embodiments, the piece of meat to be further cut into smaller components is a wing section, including a rib, a plate and a navel. In some embodiments, the piece of meat is a forequarter, which includes the wing section, as well as a chuck, chuck short ribs and a brisket bone. The wing section and the forequarter include a spinal groove and vertebral bone. Vertebral bones are commonly referred to in the art as chine bones. The spinal groove may be used to align the piece of meat on a conveyor of the automated system. At least two cuts are performed on the piece of meat using the automated system described herein. The chine bone may be used to determine a location of at least one of the cuts on the piece of meat. Because the system is automated, less labor is required for performing the cuts and there is a reduction in variability from cut to cut.

As used herein, a "primal cut" refers to a cut of meat that has been separated from the carcass, and is typically further sub-divided or separated into a sub-primal or individual cuts of meat. It is recognized that, as used herein, a primal cut is not limited to a particular cut, unless specifically noted. A cut of meat that includes a rib, a plate and a navel is referred to herein as a primal cut. This is one example of a primal cut. It is recognized that a primal cut includes additional cuts of meat, such as a forequarter. The automated meat breaking system and method described herein is designed for cuts of meat having a spinal groove and vertebral bones, and is well-suited for beef primals.

Figure 1A:
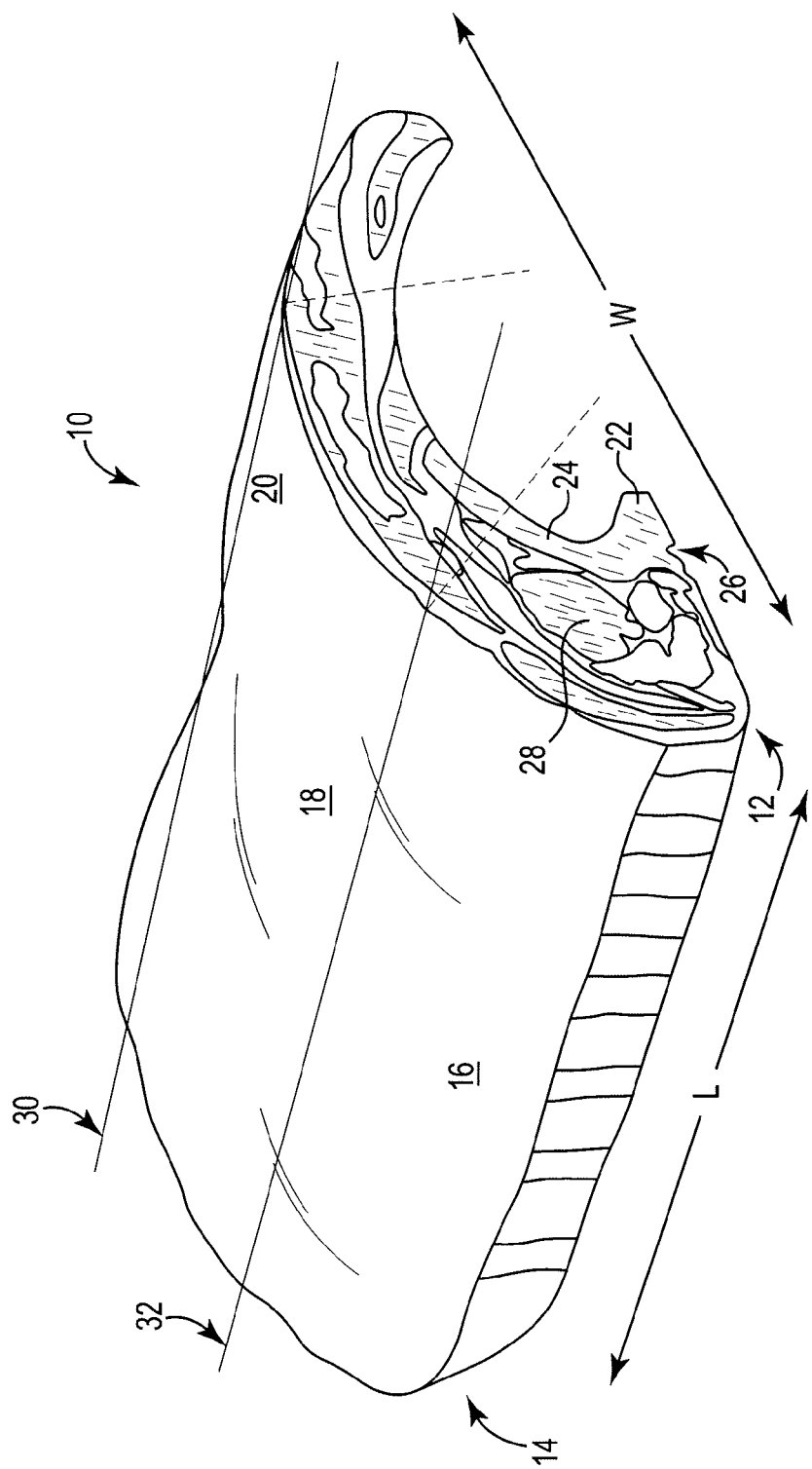
FIG. 1A is a perspective view of a primal cut of beef, which also may be referred to as a wing section of beef.

FIG. 1A is a perspective view of meat cut 10, which includes first end 12, second end 14, rib section 16, plate section 18, and navel section 20. Meat cut 10 is a cut of beef and may be referred to as a primal cut; it may also be referred to as a wing section. Plate section 18 may commonly be referred to as the short rib section. Each of sections 16, 18 and 20 runs a length L of meat cut 10. The length L of meat cut 10 may vary depending, in part, on the size of the animal the cut originated from. In one example, the length L of meat cut 10, which is beef, may range between about 15 and about 22 inches. In some embodiments, a width W of meat cut 10 may range between about 18 and about 24 inches. It is recognized that the width W may vary from cut to cut. First end 12 of meat cut 10 is known as a chuck end of rib 16; second end 14 of meat cut 10 is known as a loin end of rib 16.

Rib or rib section 16 includes chine bone 22, rib bones 24, spinal groove 26, and rib product 28. Chine bone 22, which is the vertebral column, is typically separated from rib 16 during processing. (A method and system for removing chine bone 22 is described in PCT/US2006/038645.) As described further below, the automated system and method described herein is used to separate meat cut 10 into its three components—rib 16, plate 18 and navel 20. As such, two cuts are performed on meat cut 10. Solid line 30 in FIG. 1A shows approximately where the first cut will traverse an outside surface of meat cut 10 to separate navel section 20 from plate and rib sections 18 and 16. Solid line 32 in FIG. 1A shows approximately where the second cut will traverse the outside surface of meat cut 10 to separate rib section 16 and plate section 18. The dashed lines in FIG. 1A, which extend from solid lines 30 and 32, show where the first and second cuts are lined up on meat cut 10a based on its cross sectional area (also see FIG. 1B).

Figure 1B:
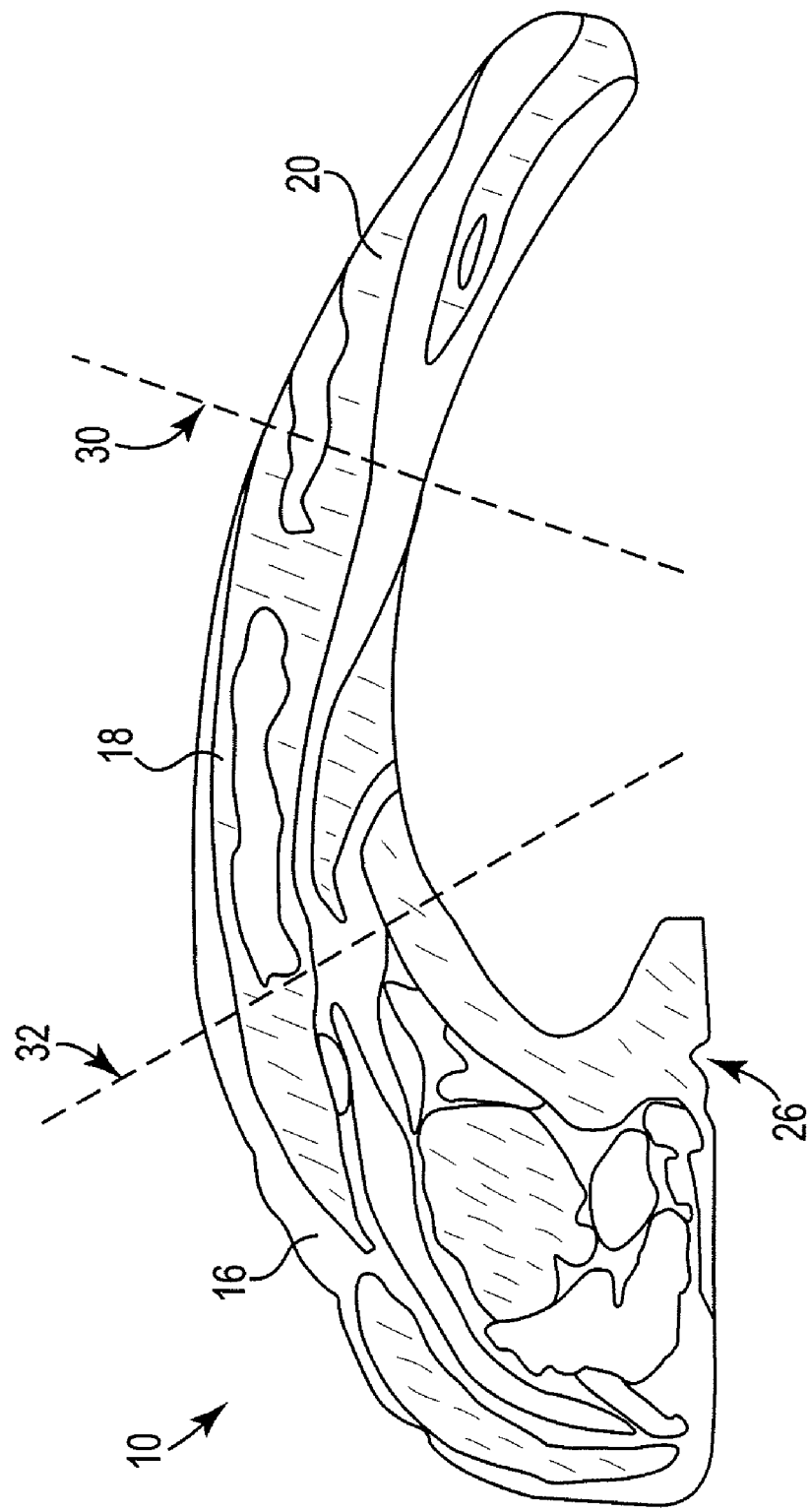
FIG. 1B is a side view of the primal cut of beef shown in FIG. 1A, which includes a rib, a navel, and a plate.

FIG. 1B is a side view of meat cut 10 taken from first end 12 and thus shows the chuck end of rib 16. Meat cut 10 is one of the major primals of the beef carcass and it is typically separated into its sub-components—rib section 16, plate section 18 and navel section 20. The locations of where the first and second cuts will be made are also shown as dashed lines 30 and 32 in FIG. 1B. Historically, the cuts to separate meat cut 10 have been made manually, for example, using a hand-held circular saw. As described further below, a system and method is described herein for automating the separation process of cut 10 into the sub-components.

Meat cut 10 may be described herein as meat cut 10 even after one or both of the two sub-components have been removed. For example, meat cut 10 may still be called meat cut 10 when only rib section 16 remains, and plate and navel sections 18 and 20 have been broken off or removed from cut 10. Similarly, the wing section may refer to a cut having a rib, a plate, and a navel. The cut may still be referred to as the wing section even after the navel and in some cases, the navel and the plate, have been removed.

Figure 2:
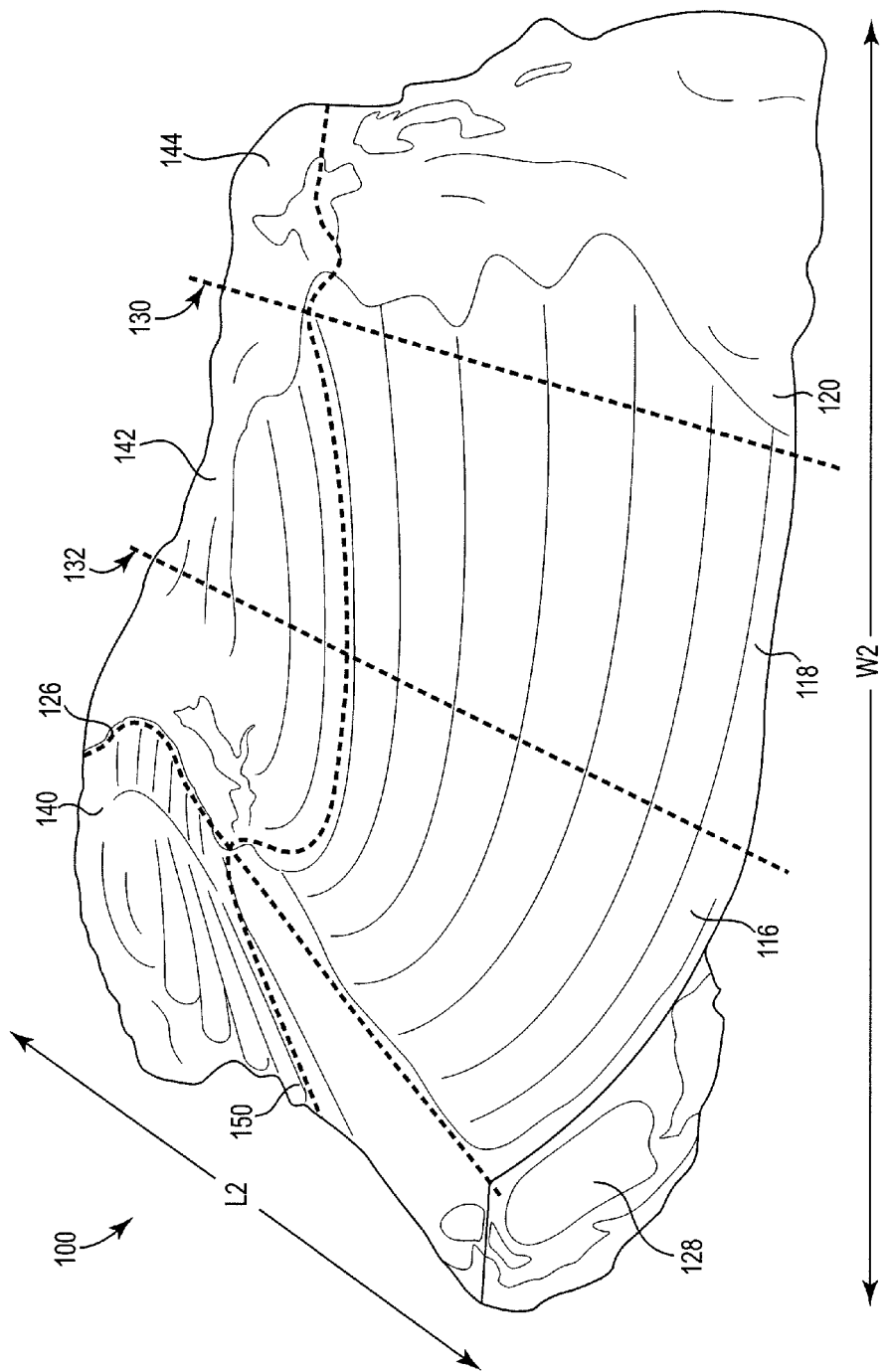
FIG. 2 is a perspective view of another primal cut of beef, referred to as a forequarter, which includes the wing section of FIGS. 1A and 1B, as well as a chuck, chuck short ribs, and brisket bone.

FIG. 2 is a perspective view of meat cut 100, which is another example of a primal cut of beef in addition to meat cut 10 of FIGS. 1A and 1B. Meat cut 100 is referred to herein as a forequarter and includes rib section 116, plate section 118, navel section 120, rib product (ribeye) 128, chuck section 140, chuck short ribs 142, and brisket bone 144. Rib 116, plate 118, navel 120, and rib product 128 are essentially the same as rib 16, plate 18, navel 20, and rib product 28 of meat cut 10. Thus, meat cut 100 is a bigger primal cut that includes meat cut 10. Dashed line 150 represents separation between the wing section (meat cut 10) and the additional chuck portion, which includes chuck section 140, chuck short ribs 142, and brisket bone 144. Length L2 of meat cut 100 is greater than length L of meat cut 10, whereas width W2 of meat cut 100 is essentially the same as width W of meat cut 10. Although not visible in FIG. 2, meat cut 100 also has a spinal groove, similar to spinal groove 26 of cut 10, which extends through rib section 116 and chuck section 140. An approximate location of the spinal groove on meat cut 100 is shown in FIG. 2 as dashed line 126. In the embodiment shown in FIG. 2, meat cut 100 does not include the appendicular skeleton. However, it is recognized that, in other embodiments, a forequarter that includes the appendicular skeleton may undergo separation using the automated system described herein.

In some cases, chuck section 140, chuck short ribs 142 and brisket bone 144 are separated from the wing section (i.e. rib section 116, plate section 118 and navel section 120) before the wing section undergoes further separation. However, because chuck section 140 also includes the spinal groove that extends through rib section 116, meat cut 100 is well configured to also undergo separation using the automated meat breaking system and method described herein.

Dashed line 130 represents a location of a first cut that would be performed on meat cut 100. Dashed line 132 represents a location of a second cut that would be performed on meat cut 100. After performing the first and second cuts, rib section 116 and chuck section 140 would remain, which could then be separated along dashed line 150. This last separation of rib 116 and chuck 140 may be automated or performed manually.

Figure 3:
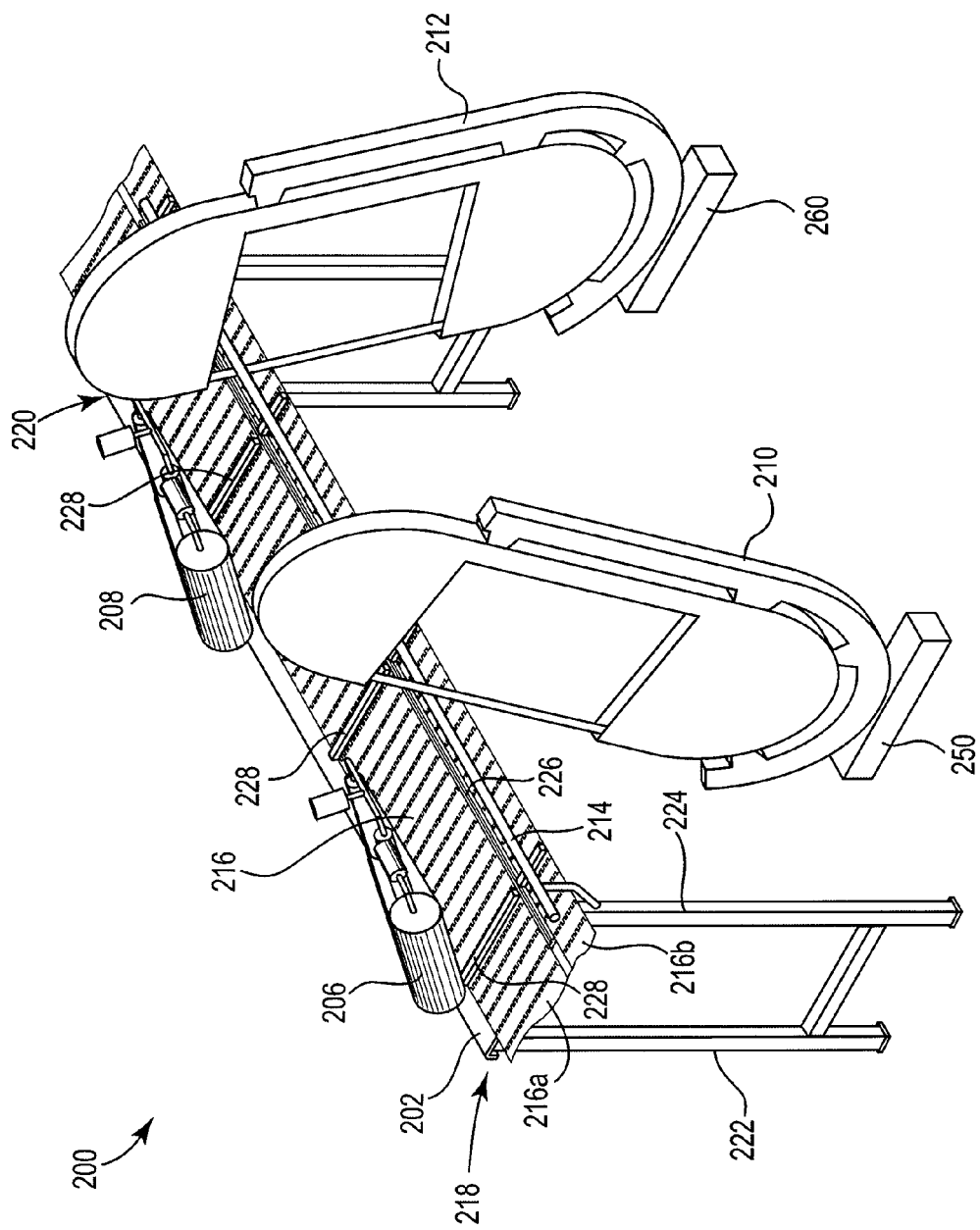
FIG. 3 is a perspective view of an automated meat breaking system.

FIG. 3 is a perspective view of automated meat breaking system 200, which includes work surface 202, first drive system 206, second drive system 208, first cutting assembly 210, second cutting assembly 212, and support rail 214. Automated meat breaking system 200 is designed to separate a meat cut into three cuts of meat. In one embodiment, system 200 receives a cut of meat similar to meat cut 10 of FIGS. 1A and 1B and separates the meat cut into its sub-components—rib, plate, and navel.

Work surface 202 of system 200 is a generally horizontal surface and includes conveyor 216, which is configured to advance meat cuts from a first end 218 of system 200 to a second end 220 of system 200. Conveyor 216 is actuated by a power source (not shown). Conveyor 216 runs in a continuous loop (i.e. the conveyor runs on an underside of work surface 202) such that conveyor 216 is able to continuously move from first end 218 to second end 220. It is recognized that a conveyor is just one example of a device that may be used in system 200 for advancing a meat cut from first end 218 to second end 220. Work surface 202 is supported by four legs—legs 222 and 224 at first end 218 and two additional legs (not visible) at second end 220. Optionally, work surface could be supported using other designs, such as, for example, a pedestal-style design (not shown). Work surface 202 also includes spinal channel guide rail 226 which cuts through conveyor 216, thus separating conveyor 216 into sections 216a and 216b. Conveyor section 216b may optionally be excluded. In the embodiment shown in FIG. 3, spinal channel guide rail 226 is stationary. Conveyor 216 includes a plurality of cleats 228 that are attached to conveyor 216 and are described further below in reference to FIG. 4A.

First drive system 206 and second drive system 208 are configured to support a meat cut as it advances on conveyor 216 and are described in more detail below in reference to FIGS. 4 and 4A. First cutting assembly 210 is configured to perform a first cut on the meat cut and second cutting assembly 212 is configured to perform the second cut on the meat cut.

System 200 may optionally include an imaging system (not shown) to determine a location of the cuts performed by first and second cutting assemblies 210 and 212. As such, the imaging system may obtain data relating to characteristics of the meat cut going through system 200 and communicate with a control system to adjust operation of system 200. (See FIGS. 9 and 10 below, and the corresponding description also below.) An imaging system is an optional component of automated meat breaking system 200, since the location of the cuts may be determined anatomically, as described below. In some embodiments, however, an imaging system may be preferred.

Support rail 214, as shown in FIG. 3, is elevated above work surface 202. Support rail 214 is configured to support a meat cut as it travels on conveyor 216. More specifically, with reference to meat cut 10, support rail 214 is designed to contact an underside of plate section 18 of meat cut 10. (See FIGS. 5A and 5B.)

Figure 4:
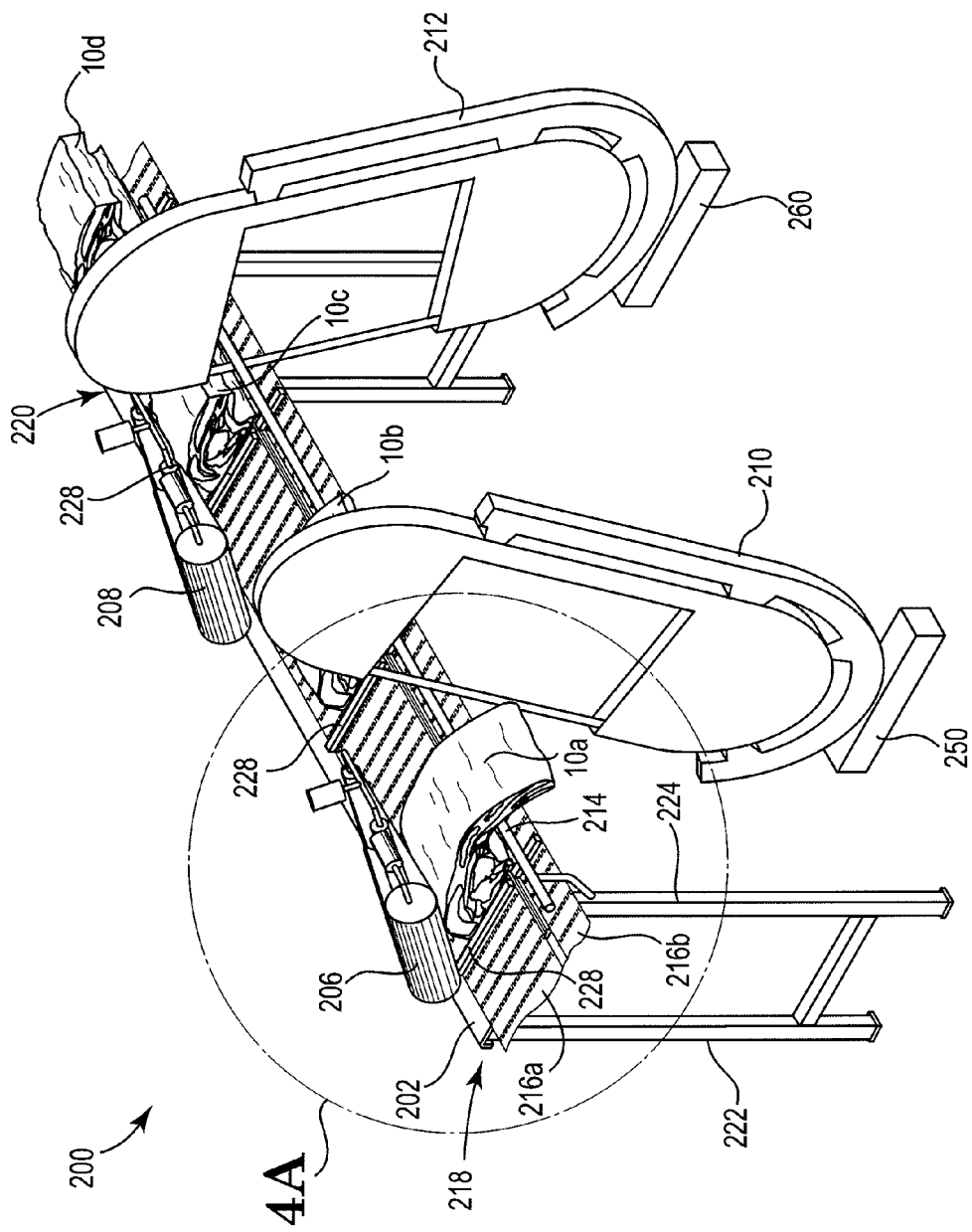
FIG. 4 is a perspective view of the system of FIG. 3 and further includes primal cuts of beef undergoing separation using the meat breaking system.

FIG. 4 is a perspective view of system 200 of FIG. 3 and further includes four meat cuts—cuts 10a, 10b, 10c, and 10d. Meat cut 10a is essentially the same as meat cut 10 from FIGS. 1A and 1B and thus includes rib section 16a, plate section 18a, and navel section 20a.

First cutting assembly 210 performs the first cut on meat cut 10a to separate navel section 20a from plate section 18a. Second cutting assembly 212 performs the second cut on meat cut 10a to separate plate section 18a from rib section 16a. In an embodiment shown in FIG. 4, first cutting assembly 210 is a band saw and is described in more detail below in reference to FIG. 6; second cutting assembly 212 is also a band saw and is described in more detail below in reference to FIG. 7. As shown in FIG. 4, meat cut 10a is just starting to contact first cutting assembly 210 and thus has not yet undergone any separation or breaking. Meat cut 10b has already passed through the cutting path formed by first cutting assembly 210 and thus the navel section of cut 10b has already been removed. Meat cut 10c is further along on conveyor 216 and thus the navel section of cut 10c has already been removed. Moreover, cut 10c has just passed through the cutting path formed by second cutting assembly 212; thus the plate section of cut 10c has also been removed. Similarly, both the navel and plate sections have already been removed from meat cut 10d and the rib section of cut 10d remains.

For all of the meat cuts shown in FIG. 4, a leading end of the cut on conveyor 216 is the loin end and a trailing end of the cut is the chuck end. However, as recognized by one skilled in the art, each of cuts 10a, 10b, 10c, and 10d has a corresponding cut taken from the other side of that animal. Those corresponding cuts may also be separated or broken using system 200. The main difference is that the leading end of the corresponding cut on conveyor 216 would be the chuck end and the trailing end would be the loin end. System 200 is designed to handle cuts from the right and the left side of the animal interchangeably. Thus, the right and left cuts may alternate in system 200, or as shown in FIG. 4, all cuts from the same half of the animals may be processed and then the corresponding cuts from the other half of the animals may be processed.

System 200 is described as an automated meat breaking system. System 200 is designed such that meat cuts 10a, 10b, 10c, and 10d undergo breaking or separation into the respective subcomponents with minimal or no operator intervention during normal operation of system 200. However, it is recognized that even though system 200 is configured to be fully automated, system 200 includes the option for operator control and override. First and second cutting assemblies 210 and 212 are configured to be automated cutting assemblies such that a human is not required for normal operation of first and second cutting assemblies 210 and 212. It is recognized that adjustments may be made to first and second cutting assemblies 210 and 212. These adjustments may be automated and made, for example, by a control system (see FIG. 10). Alternatively, adjustments may be made through operator intervention. An advantage of first and second cutting assemblies 210 and 212 being automated is that there will be less variability from meat cut to meat cut, since a human is not making an assessment of where to perform the cut. The locations of the cutting paths for first and second cutting assemblies 210 and 212 are described in further detail below, and are based, in part, on a location of the chine bone on the conveyor.

Figure 4A:
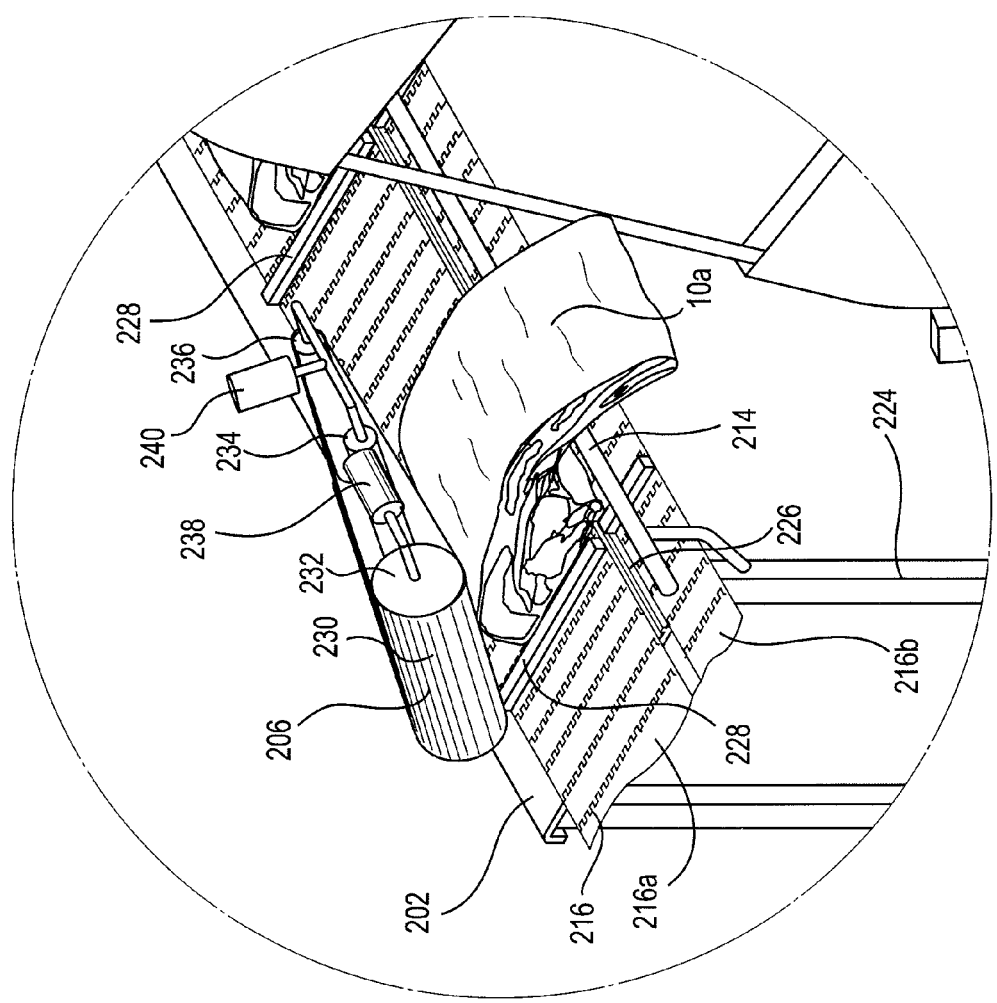
FIG. 4A is an exploded view of a portion of the system of FIG. 4 to further illustrate some of the features of the meat breaking system.

FIG. 4A is an expanded view of a portion of FIG. 4 to further illustrate features of system 200. As shown in FIG. 4A, conveyor 216 includes sections 216a and 216b, and spinal channel guide rail 226 which runs a length of conveyor 216. Spinal channel guide rail 226 is configured to engage with a spinal groove of meat cut 10a. In one embodiment, spinal channel guide rail 226 is a protrusion that is sized to mate with the spinal groove. It is recognized that other features may be used to engage with the spinal groove of the meat cut.

System 200 includes features to help support meat cut 10a as it advances on conveyor 216. In one embodiment, cleats 228 are configured to contact a trailing edge of each meat cut and push the meat cuts on conveyor 216. As shown in FIG. 4A, cleat 228 essentially functions as a backstop to prevent meat cut 10a from moving backward on conveyor 216, or in a direction opposite to the direction of movement by the conveyor. Cleats 228 may be important as some meat cuts are slippery and may not easily grip to conveyor 216. As shown in FIG. 4, cleats 228 contact the trailing end (i.e. the chuck end) of each of meat cuts 10a, 10b and 10c. (The cleat for meat cut 10d is not visible in FIG. 4.) It is recognized that other features, such as panels on conveyor 216, may be used to push meat cut 10a.

First drive system 206 is also used to support and advance meat cut 10a. As shown in FIG. 4A, first drive system 206 includes conveyor belt 230, which is supported by guide wheels 232, 234 and 236. First drive system 206 thus functions similar to a caterpillar-style drive. Hydraulic piston 238 applies pressure to belt 230, while hydraulic piston 240 picks up slack of conveyor belt 230, such that conveyor belt 230 pushes against an outer surface of rib section 16 to stabilize cut 10a. First drive 206 prevents cut 10a from moving in a direction other than the direction of movement by conveyor 216. Second drive 208 operates similarly to first drive 206. Drives 206 and 208 are one example of a device that uses a pressurized belt to put pressure on the outer surface of rib section 16 and stabilize cut 10a in a direction perpendicular to the direction of movement of conveyor 216. Mounting system for securing drives 206 and 208 are not shown in the figures. Moreover, the motor for powering drives 206 and 208 is not shown in the figures. It is recognized that other types of mechanical devices may be used in addition to or as a substitute to drives 206 and 208. Although two drives are shown in the embodiment of FIG. 3, it is recognized that in other embodiments, one drive may be used; in other embodiments, more than two drives may be used.

Due to the dimensions and weight of plate section 18a and navel section 20a on meat cut 10a, support rail 214 is configured to contact an underside of plate section 18a and prevent cut 10a from tipping in a direction away from work surface 202 and into first and second cutting assemblies 210 and 212. (Support rail 214 is more visible in FIGS. 5A and 5B.) Drives 206 and 208 provide counteracting support, relative to support rail 214. Drives 206 and 208 essentially push down on rib section 16 to keep rib section 16 on conveyor 216, whereas support rail 214 pushes up on an underside of plate section 18. In other embodiments, system 200 may include either support rail 214 or drives 206 and 208. It is recognized that system 200 may include other types of support devices in addition to or as a substitute to drives 206 and 208 and/or support rail 214.

As stated above, anatomical markers on meat cut 10 may be used to determine the location of the first cut (line 30 of FIG. 1A) and the second cut (line 32 of FIG. 1A). This is described in further detail in reference to FIGS. 5A and 5B.

Figure 5A:
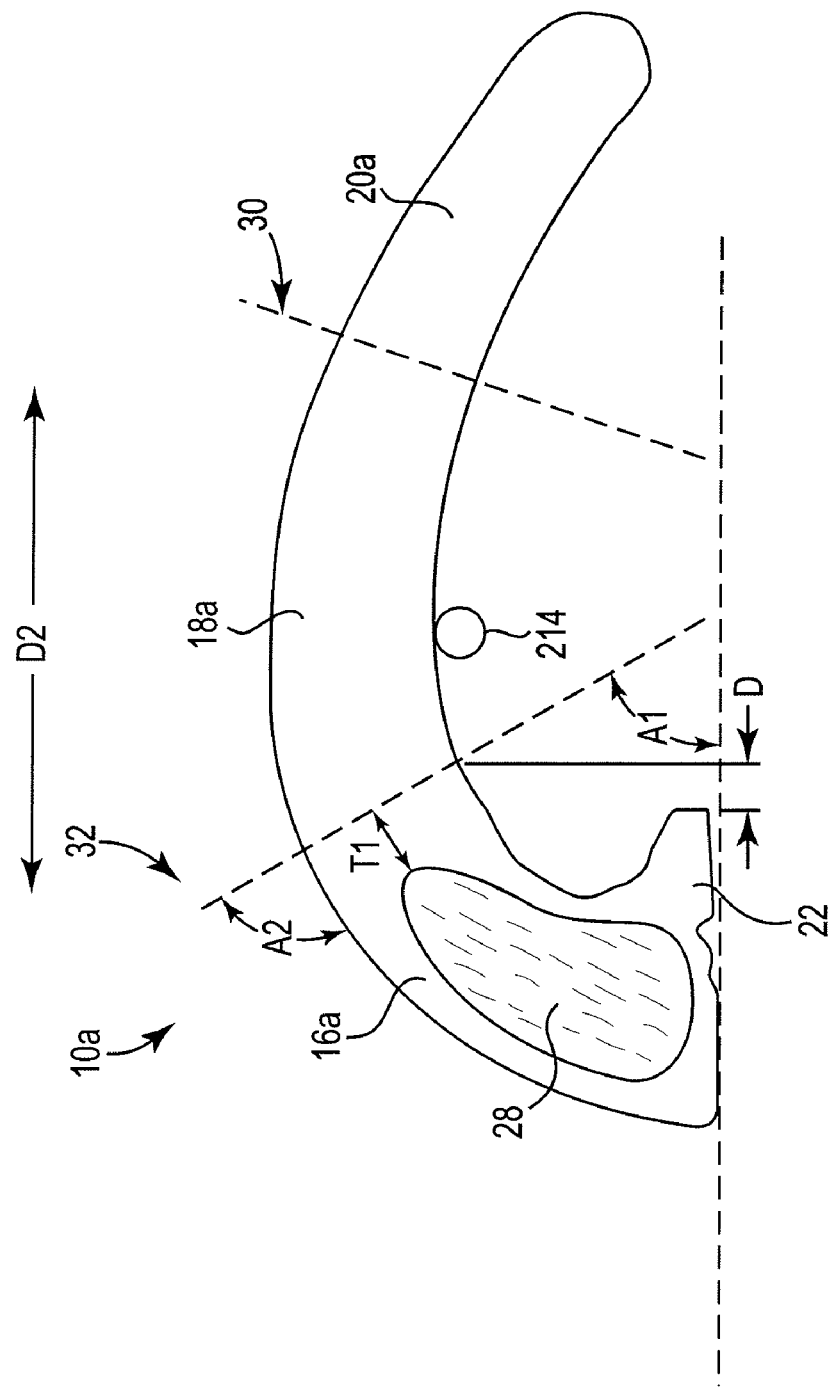
FIG. 5A is a end view of one of the primal cuts of beef from FIG. 4 at the loin end to illustrate how the automated meat breaking system of FIGS. 3 and 4 determines the location of the cuts on the primal cut.
Figure 5B:
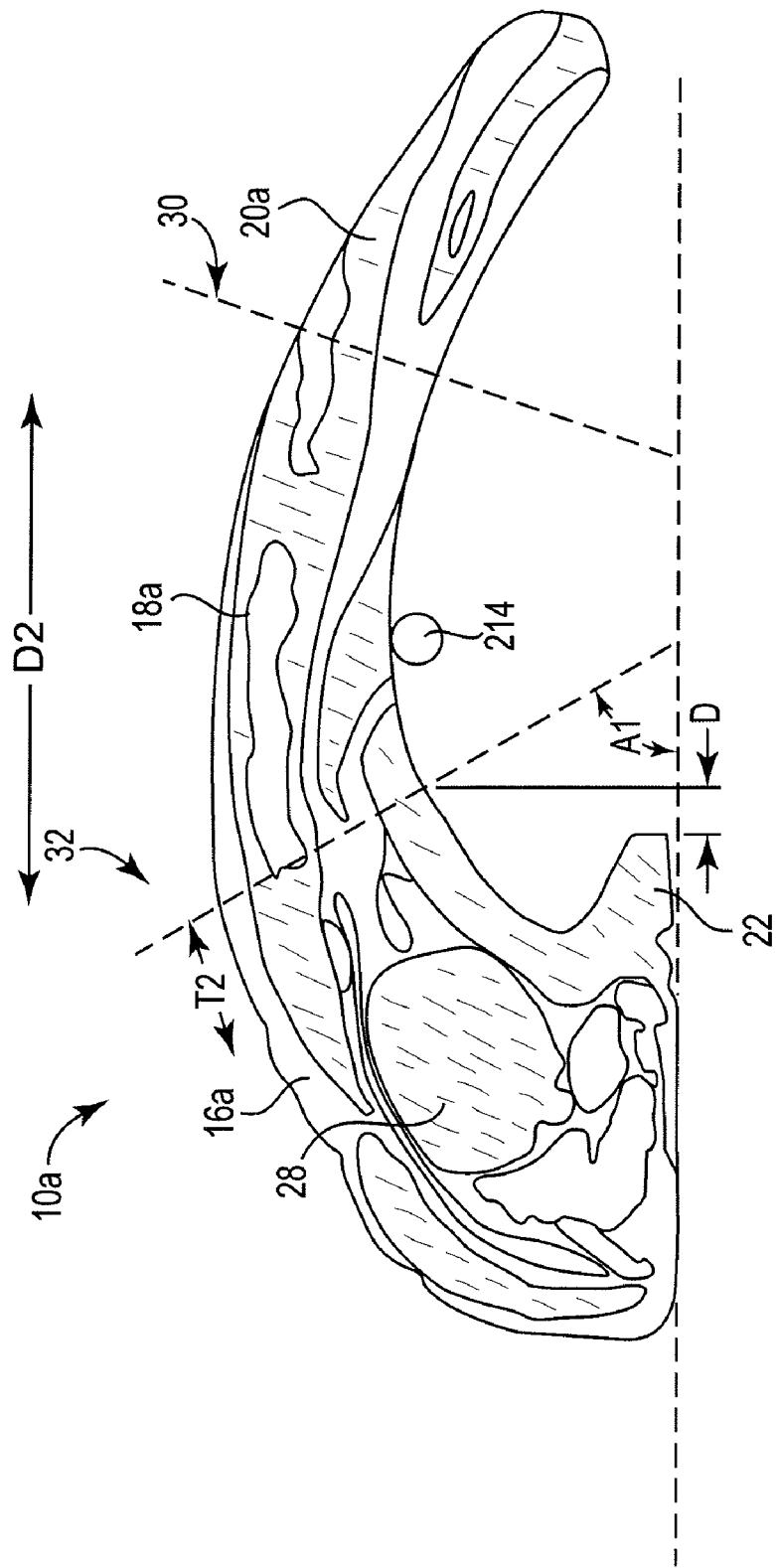
FIG. 5B is a cross-sectional view of the primal cut from FIG. 5A, taken near the chuck end to further illustrate the location of the cuts.

FIG. 5A is an end view of meat cut 10a at the loin end. FIG. 5A in conjunction with FIG. 5B illustrate how system 200 determines the location of the first cut and the second cut on meat cut 10a. As described above, the first cut (taken along dashed line 30) separates navel section 20a from rib and plate sections 16a and 18a, and the second cut (taken along dashed line 32) separates the plate 18a from rib section 16a. Even though the separation between plate 18a and rib 16a is the second cut, in some embodiments, the method includes determining a location of the second cut before the determination of the first cut. In those cases, a location of the first cut is then made relative to the second cut.

In some embodiments, chine bone 22a on meat cut 10a is used to determine the location of the second cut (dashed line 32). More specifically, dashed line 32 is started on an underside of meat cut 10a directly above a predetermined distance D from chine bone 22. In one embodiment, distance D is equal to about ½ inch. An angle A1 of the second cut is determined based on the conformation or curvature of the outer surface of rib section 16a. More specifically, angle A1 is chosen such that the angle between the cut and the outer surface of rib section 16a (designated as angle A2 in FIG. 5A) is approximately 90 degrees. In the embodiment shown in FIG. 5A, angle A1 is between about 55 and about 65 degrees. In another embodiment, angle A1 may be between about 65 and 75 degrees. Optionally, the angle may transition during the cut such that angle A1 may range between 65 and 75 degrees on the chuck end (see FIG. 5B) and transition to a range of 55 to 65 degrees on the loin end.

Tail T1 is the distance between an outer tip of rib product 28 (i.e. ribeye muscle) and dashed line 32 (i.e. the second cut). The area of rib 16a that includes tail T1 is commonly a combination of fat and low value meat. Typically meat products are processed to comply with product specifications, one of which may include the tail on a ribeye cut. A typical requirement is that a subprimal rib is cut to have no more than 3 inches of tail on the loin end and 4 inches of tail on the chuck end (see FIG. 5B); in some cases, the permissible amount of tail may be, for example, no more than 1 inch on both ends. The location of dashed line 32, based on distance D being equal to about ½ inch, results in rib 16 having tail T1 of approximately three inches. It is recognized that tail T1 may be decreased or increased by adjusting distance D and/or angle A1.

As mentioned above, in some embodiments, the location of the second cut is determined before the location of the first cut. From a product and quality standpoint, the location of the second cut is typically more important than the location of the first cut. The second cut determines how much tail the ribeye product will have on it, which is often a requirement of the rib product. In contrast, plate and navel sections 18a and 20a may commonly be used for ground beef, after the bones are removed. Thus the dimensions of plate 18a and navel 20a are more flexible and/or variable, as compared to rib 16a. A location of the first cut (dashed line 30) is thus determined based on the second cut (dashed line 32). In some embodiments, a distance D2 between dashed lines 30 and 32 is about 9 and 12 inches. In other embodiments, D2 is about 11 inches. It is recognized that distance D2 may be more or less depending on the desired width of plate 18a and/or navel 20a.

FIG. 5A also illustrates support rail 214, which contacts an underside of plate 18. As shown in FIG. 3, support rail 214 is suspended above conveyor 216. It is recognized that, in some embodiments, support rail 214 could be located on another area of cut 10a, such as, for example, an underside of plate 20a. Alternatively, more than one support rail could be used on the underside of cut 10a.

FIG. 5B is a cross-sectional view of meat cut 10a taken near the chuck end. FIG. 5B illustrates where the second cut (dashed line 32) is located on the chuck end. Tail T2 is similar to tail T1 and is the distance between the end of ribeye muscle 28 and dashed line 32, at the chuck end of rib 16. Tails T1 and T2 are linked together and thus will increase or decrease together since both are based on the location of dashed line 32. In the embodiment shown in FIG. 5B, tail T2 is about 4 inches. As stated above in reference to tail T1, tail T2 is decreased or increased by adjusting distance D and/or angle A1. Distance D2 between the first cut (dashed line 30) and the second cut (dashed line 32) is about the same as at the ribeye end (see FIG. 5A) and thus, in the embodiment of FIG. 5B, is about 10 inches. Note that support rail 214 is shown in FIG. 5B as well.

As mentioned above, dimensions of plate section 18a and navel section 20a may be more variable, from a product standpoint, as compared to dimensions of rib 16a. As such, it is recognized that the location of the first cut (dashed line 30) may vary. An advantage of the system and method described herein is the ability to use the chine bone as an easy anatomical marker to then determine a location of the second cut (dashed line 32), based, in part, on the product specification or requirements for rib 16.

From carcass to carcass, there is typically some variability in the dimensions of the wing section generally, and the specific dimensions of the rib section, the plate section, and the navel section. An advantage of the system and method described herein is that the location of the second cut is determined as a function of the chine bone. The location of the chine bone on the conveyor will be fixed due to the engagement between the spinal groove of the rib section and the spinal channel guide rail on the work surface. As such, the chine bone should be a consistent reference point across multiple carcasses for consistently determining the location of the second cut. This consistency allows for the meat cuts to more consistently meet product specifications without having to make adjustments to system 200 for each meat cut.

Referring back to system 200 of FIG. 4, meat cut 10a starts at first end 218 of system 200. The first cut is performed by first cutting assembly 210 and is described further below in reference to FIG. 6. The second cut is performed by second cutting assembly 212 and is described further below in reference to FIG. 7.

Figure 6:
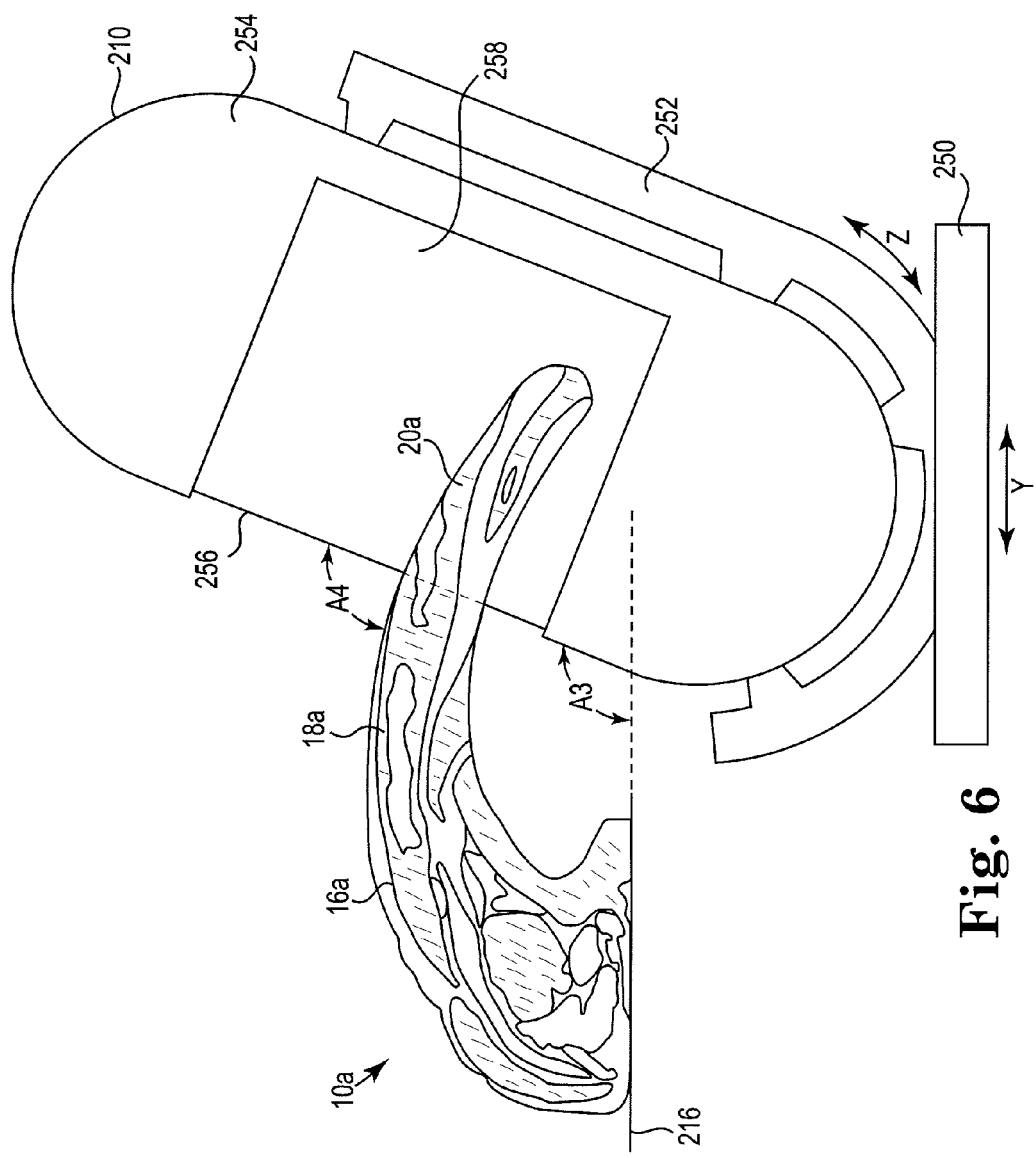
FIG. 6 is an end view of the primal cut and the first cutting assembly of the automated meat breaking system to illustrate how a first cut is performed on the primal cut.

FIG. 6 is an end view of meat cut 10a and first cutting assembly 210 from FIG. 4. FIG. 6 is simplified to only show cut 10a and cutting assembly 210. Cut 10a is shown on conveyor 216 in FIG. 6; however, the supporting components of conveyor 216 and work surface 202 are not included in FIG. 6 for simplicity. First cutting assembly 210 was introduced in FIG. 3 and performs the first cut on meat cut 10a to separate navel 20a from plate 18a.

In the embodiment shown in FIGS. 3 and 6, first cutting assembly 210 is a band saw and includes support stand 250, pivoting base 252, cover 254, and saw blade 256. Support stand 250 is configured such that first cutting assembly 210 may easily be moved in direction Y to either increase or decrease the dimension of navel 20a being removed from cut 10a. First cutting assembly 210 is configured to perform the first cut at angle A3. Pivoting base 252 is configured such that angel A3 may be increased or decreased by moving base 252 in direction Z. Cutting assembly 210 also includes opening 258. As cut 10a travels on conveyor 216, the loin end of cut 10a first comes into contact with blade 256, which is a continuous belt or band that rotates around two wheels (not shown) inside cover 254. Although not visible in FIG. 6, the leading edge of blade 256 includes a continuous set of teeth (not shown) that cut through meat cut 10a as cut 10a passes through the cutting path of blade 256. Once the chuck end of cut 10a passes through blade 256, navel section 20a is completely removed from the remaining sections of cut 10a (i.e. rib section 16a and plate section 18a).

Angle A3 is based, in part, on an angle between the first cut and the outer surface of the meat between plate 18a and navel 20a (designated as angle A4 in FIG. 6). As similarly described above in reference to angles A1 and A2 in FIG. 5A, in some embodiments, angle A4 is about 90 degrees. As such, angle A3 is between about 110 and about 130 degrees.

Figure 7:
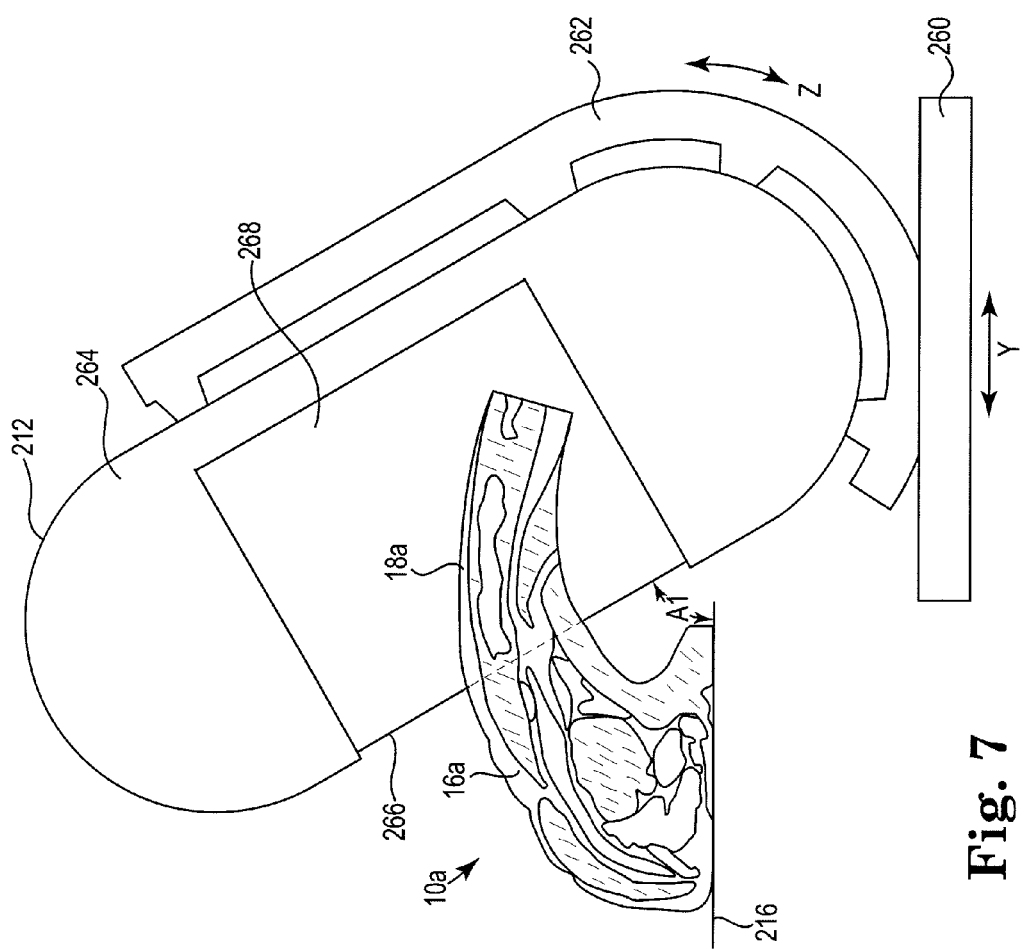
FIG. 7 is an end view of the primal cut and the second cutting assembly to illustrate how a second cut is performed on the primal cut.

FIG. 7 is an end view of meat cut 10a and second cutting assembly 212 from FIG. 4. Similar to FIG. 6, FIG. 7 is also simplified to only show cut 10a and cutting assembly 212. As shown in FIGS. 3 and 4, second cutting assembly 212 is located downstream of first cutting assembly 210. When second cutting assembly 212 receives meat cut 10a, navel section 20a has already been removed. Second cutting assembly 212 performs the second cut on meat cut 10a to separate plate 18a from rib 16a.

In the embodiment shown in FIGS. 3 and 7, second cutting assembly 212 is a band saw and, similar to first cutting assembly 210, includes support stand 260, pivoting base 262, cover 264, saw blade 266 and opening 268. Second cutting assembly 212 is configured to perform the second cut at angle A1, which may be increased or decreased by moving pivoting base 262 in direction Z. As similarly described above for first cutting assembly 210, blade 266 has a continuous set of teeth that form a cutting path. As cut 10a passes through the cutting path of blade 266, plate 18a is separated from rib 16a.

As shown in FIG. 7, second cutting assembly 212 is much closer to conveyor 216, as compared to first cutting assembly 210. Given angle A1 and the resulting orientation of cutting assembly 212, there is sufficient clearance for cutting assembly 212 to receive cut 10a, but without any interference between cutting assembly 212 and work surface 202 and other components of system 200. Support rail 214 is configured such that it will pass through opening 268 of cutting assembly 212 (see FIGS. 3 and 4). In other embodiments, the support rail may not run all the way to second end 220 of system 200, but rather would terminate at a location prior to or upstream of second cutting assembly 212.

After passing through second cutting assembly 212, the remaining portion of meat cut 10a on conveyor 216 consists of rib section 16a. As described above in reference to FIG. 2, another example of a primal cut suitable for breaking or separation by system 200 is a forequarter (i.e. meat cut 100 of FIG. 2). If system 200 started with meat cut 100, which includes the wing section, as well as chuck section 140, chuck short ribs 142, and brisket bone 144, at the end of system 200, rib section 116 and chuck section 140 would remain. The loin end of the wing section would be the leading end of meat cut 100 of FIG. 2 on the conveyor. As described above in reference to meat cuts 10a, 10b, 10c and 10d of FIG. 4, if the corresponding forequarter from the other side of the animal were to undergo processing using automated system 200, the leading end of the meat cut would be the chuck end. Rib section 116 and chuck section 140 may then be separated manually or using another automated breaking system.

Figure 8:
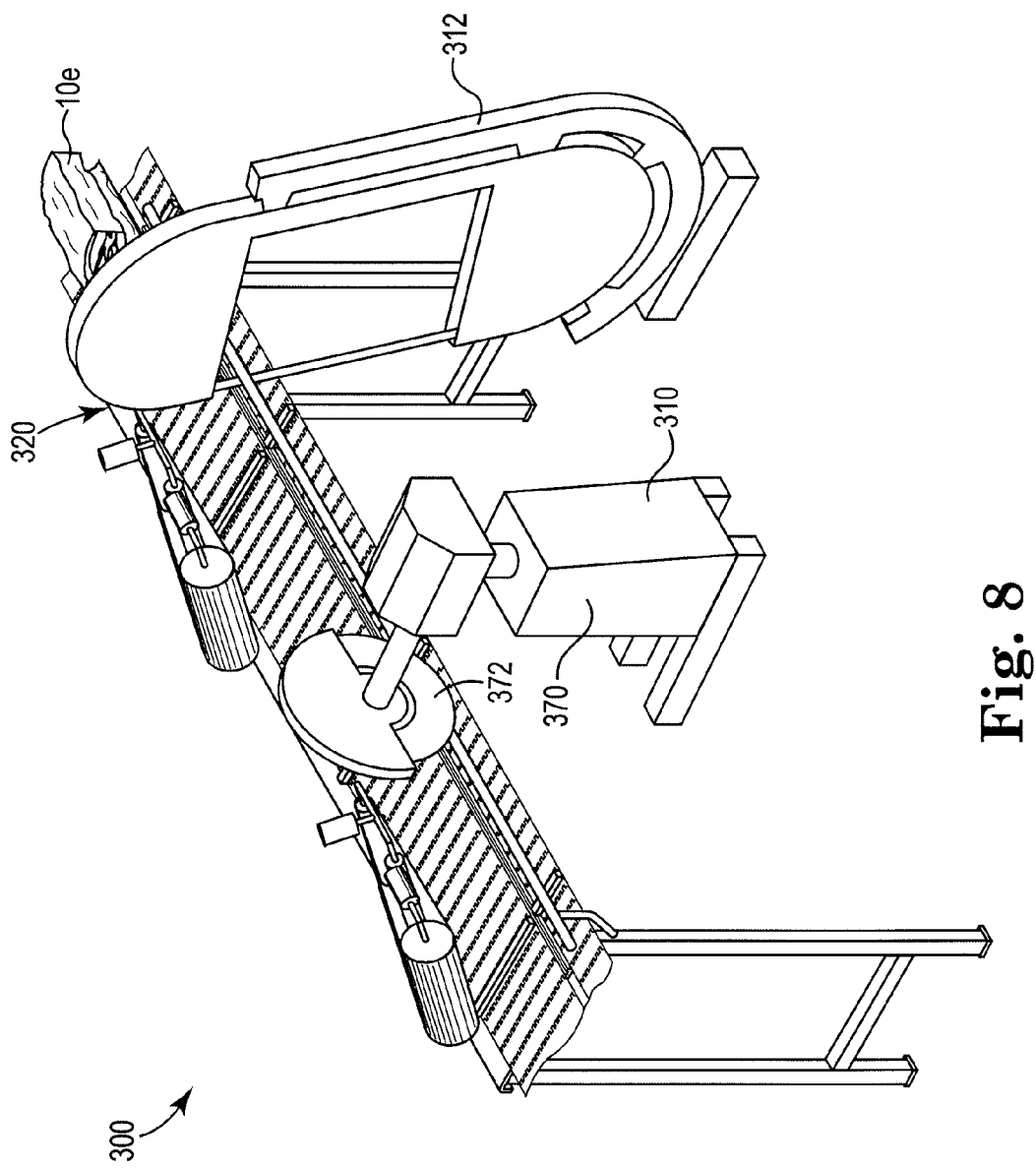
FIG. 8 is a perspective view of an alternative embodiment of an automated meat breaking system.

FIG. 8 is a perspective view of automated meat breaking system 300, which is an alternative embodiment of system 200. The components of system 300 are the same as system 200, with the exception that, in system 300, first cutting assembly 310 is a circular saw. Also shown in FIG. 8 is meat cut 10e which is a rib section, since the plate section and navel section have been removed by first cutting assembly 310 and second cutting assembly 312, respectfully.

First cutting assembly 310 includes support stand 370 and blade 372. Rotating blade 372 is designed to cut through meat cut 10e and separate the navel section from the plate section. It is recognized that, in other embodiments, second cutting assembly 312 may also be a circular saw. Similarly, first cutting assembly 310 may be a band saw and second cutting assembly 312 may be a circular saw. System 200 may also include any combination of band saws and circular saws.

In embodiments of the automated meat breaking system, the selection of the cutting device for the first cutting assembly and the second cutting assembly depends, in part, on the composition of the meat in the particular area being cut through. For example, between the navel and the plate an increased amount of cartilage may be present, which may make the first cut suitable for a circular saw. In contrast, the area between the plate and the rib may preferably be performed by a band saw due, in part, to presence of bone in that area.

It is recognized that other types of cutting assemblies may be used in addition to the band saws and the circular saw shown in the figures. It is also recognized that, in some embodiments, one cutting assembly may be used to perform the first cut and the second cut. In that case, the cutting assembly would be designed to have significant movement in a direction parallel to the direction of movement of the conveyor. A disadvantage of using a single cutting assembly is that the system would have a lower rate of separating meat cuts. For a system having two cutting assemblies, at least two cuts of meat may be undergoing separation at the same time (see FIG. 4). As described above, systems 200 and 300 are designed to have more than one cut of meat going through the system at a time.

Figure 9:
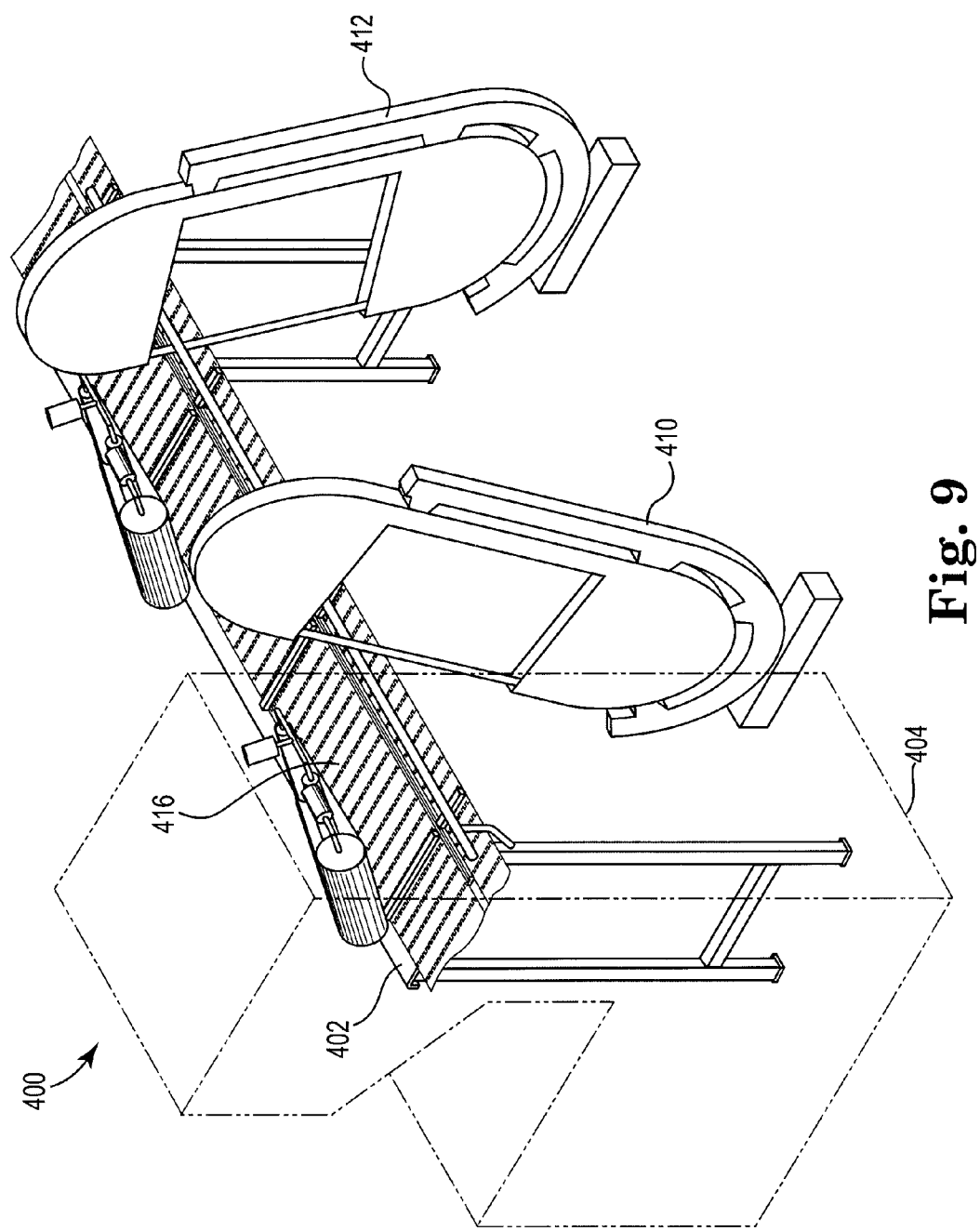
FIG. 9 is a perspective view of yet another alternative embodiment of an automated meat breaking system, which includes an imaging system.

As stated above, the automated meat breaking system and method described herein may optionally include an imaging system. FIG. 9 shows another alternative embodiment of meat breaking system 400 which includes the components of system 200 of FIG. 3, but additionally includes imaging system 404, which is secured to work surface 402. Imaging system 404 obtains data relating to the characteristics of a meat cut, as the meat cut passes through imaging system 404 while traveling on conveyor 416. Imaging system 404 is part of a control system (see FIG. 10) and communicates with a processor to adjust operation of system 400.

Imaging system 404 may include any type of imaging module, including, but not limited to, X-ray, infrared, camera, video, machine vision, ultrasound, MRI, laser-imaging, thermo-graphic imaging, and computerized tomography (CT). Examples characteristics of the meat cut that may be measured by imaging system 404 include, but are not limited to, color, composition, surface area, linear measurements such as length, width, and/or depth, and volume measurements. For example, imaging system 404 may include a topographical laser scanner for determining a location on the outer side of a meat cut that is about ½ inch away from the edge of the chine bone. Imaging system 404 works in conjunction with the control system of FIG. 10 to adjust first cutting assembly 410 and second cutting assembly 412 to control a location of the first and second cuts, based on the gathered data for the chine bone.

Figure 10:
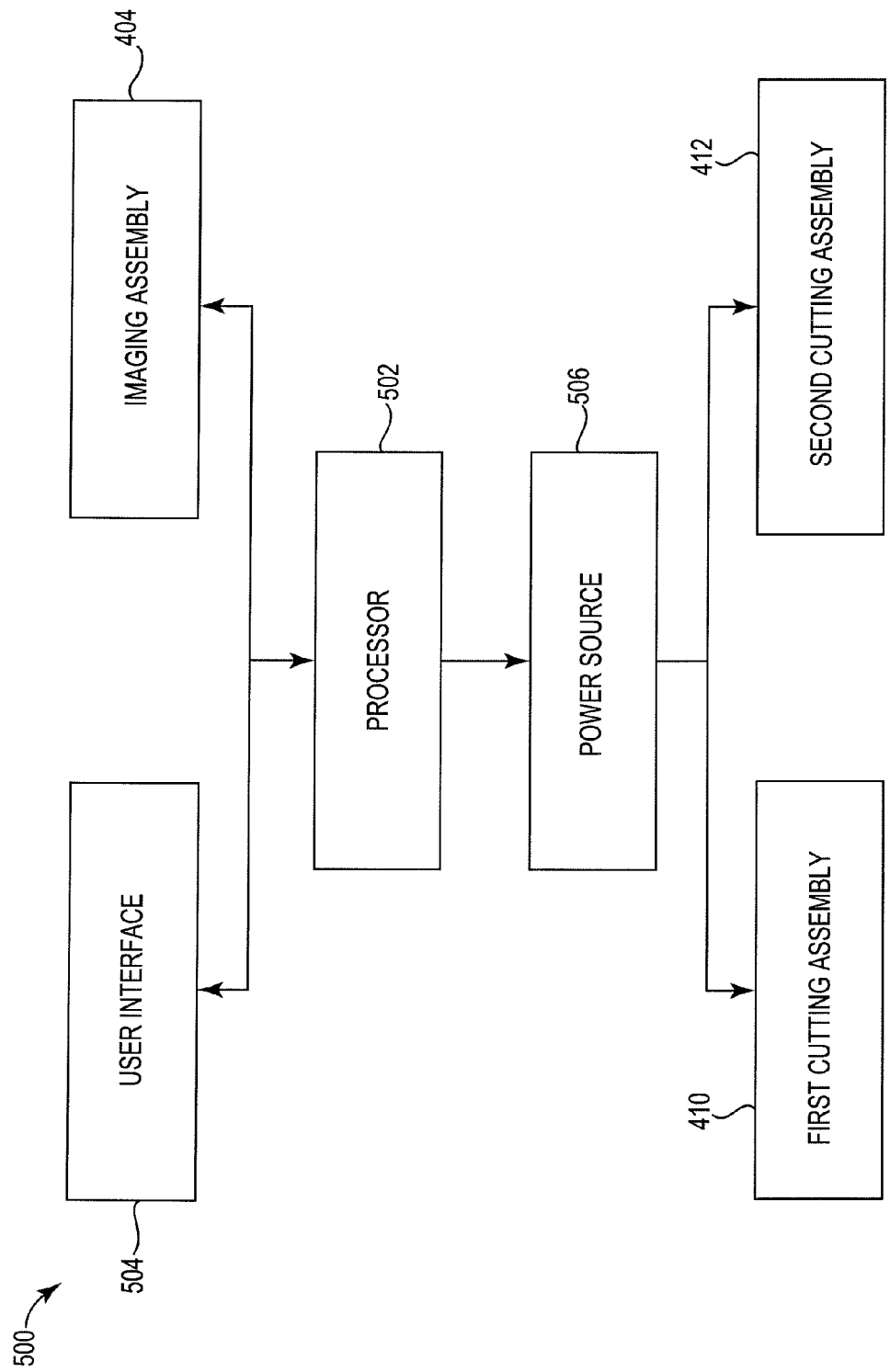
FIG. 10 is a process flow chart of a control system for operating the meat breaking system of FIG. 9.

FIG. 10 is a process flow diagram to illustrate use of control system 500 for operating automated meat breaking system 400 of FIG. 9. Control system 500 includes processor 502, user interface 504, imaging system 404 of FIG. 9, power source 506, and first and second cutting assemblies 410 and 412 of FIG. 9. As described above under FIG. 9, imaging system 404 obtains data relating to characteristics of a meat cut as it travels on conveyor 416, and imaging system 404 relays the data to processor 502, which may be a computer or other processing device. Processor 502 then analyzes the data and determines a location of the second cut, and based on the second cut, a location of the first cut. Processor 502 then communicates the location of the cuts to power source 506, which actuates first and second cutting assemblies 410 and 412 to adjust the position and/or angle of the saw blades to make the cut at the desired location.

To analyze the data received from imaging system 404, processor 502 may include software that utilizes an algorithm for determining the appropriate movement of first and second cutting assemblies 410 and 412 to establish the desired location of the first and second cuts. The software and corresponding algorithm will vary depending on the imaging module.

In some embodiments, control system 500 may perform other functions in addition to controlling the location of the cuts performed by first and second cutting assemblies 410 and 412. Examples of functions by control system 500 may include, but are not limited to, starting and stopping system 400, changing a speed of conveyor 416, changing a speed of first cutting assembly 410 and/or second cutting assembly 412.

As described above, control system 500 includes control of first and second cutting assemblies 410 and 412. Thus, first and second cutting assemblies 410 and 412 are configured to be fully automated during normal operation. It is recognized, however, that first and second cutting assemblies 410 and 412 may be manually adjusted as necessary or as desired. Similarly, at some points during operation, operator intervention may be used on other areas of system 400.

The automated system and method described herein for separating a primal cut of meat into sub-components is well designed to be used in conjunction with an automated system for removing the chine bone from the rib section. For example, referring back to FIG. 8, once the wing section (meat cut 10e) is separated such that only the rib section remains at second end 320, as shown in FIG. 8, meat cut 10e can move directly into an automated chine separation system (as described in PCT/US2006/038645). The chine separation system may be contained within the same process line as the automated breaking system described herein, or the rib section may be moved to a separate process line containing the chine separation system.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of separating a forequarter of meat to form a rib and a chuck, the method comprising:
   a. positioning the forequarter at a first end of an automated system;
   b. moving the forequarter towards a second end of the automated system;
   c. performing a first cut on the forequarter to remove a navel and a brisket bone from the forequarter, wherein the first cut is performed using at least one automated cutting assembly; and
   d. performing a second cut on the forequarter to remove a plate short ribs and a chuck short ribs from the forequarter to form a remaining portion of the forequarter, which includes a rib and a chuck, wherein the second cut is performed using the at least one automated cutting assembly.

2. The method of claim 1 wherein a location of the second cut is based on a location of a chine bone on the forequarter.

3. The method of claim 2 wherein an imaging assembly determines the location of the chine bone.

4. The method of claim 1 wherein moving the forequarter towards the second end of the automated system includes aligning a spinal groove of the forequarter with a protrusion oriented in a direction parallel to a direction of movement by a conveyor.

5. The method of claim 1 further comprising:
   separating the rib and the chuck from one another after performing the second cut on the forequarter in step d).

6. The method of claim 1 further comprising:
   supporting the forequarter as it moves towards the second end of the system using at least one of a support rail and a pressurized belt, wherein the support rail is configured to contact an underside of the forequarter, and wherein the pressurized belt is configured to contact an outer surface of the forequarter and stabilize the forequarter on the conveyor.

7. The method of claim 1 wherein the meat is beef.

8. A method of separating a wing section of beef comprising a rib, a plate, and a navel, the method comprising:
   a. positioning the wing section at one end of an automated system;
   b. directing the wing section towards a first automated cutting assembly configured for a first cutting path;
   c. separating the navel from the rib and the plate by conveying the wing section through the first cutting path;
   d. directing the wing section towards a second automated cutting assembly configured for a second cutting path; and
   e. separating the plate from the rib by conveying the wing section through the second cutting path.

9. The method of claim 8 wherein directing the wing section towards the first automated cutting assembly and directing the wing section towards the second automated cutting assembly is performed by a conveyor that moves from the first end to the second end of the automated system.

10. The method of claim 9 further comprising: securing the wing section on the conveyor by aligning a spinal groove on the wing section with a protrusion that runs a length of the conveyor.

11. The method of claim 8 wherein the wing section includes a chine bone and the second cutting path is determined as a function of a location of the chine bone on the conveyor.

12. The method of claim 11 wherein determining the location of the chine bone is performed by an imaging system.

13. The method of claim 12 further comprising:
    adjusting at least one of the first automated cutting assembly and the second automated cutting assembly as a function of the location of the chine bone.

14. The method of claim 13 wherein adjusting at least one of the first automated cutting assembly and the second automated cutting assembly is performed by a control system.

15. The method of claim 8 further comprising:
    supporting the wing section on the conveyor using at least one of a guide rail and a pressurized belt.

16. A system for cutting a primal of meat that includes a rib, a plate and a navel, the system comprising:
    a conveyor for advancing the primal of meat;
    at least one automated cutting assembly for performing a first cut to separate the navel from the plate and the rib and a second cut to separate the plate from the rib; and
    a guide for orienting the primal of meat on the conveyor.

17. The system of claim 16 wherein the guide is a protrusion configured to align with a spinal groove in the primal of meat and the protrusion is oriented in parallel with a direction of movement of the conveyor.

18. The system of claim 16 further comprising:
    a backstop configured to contact a trailing edge of the primal of meat and prevent the primal of meat from traveling in a direction opposite to a direction of movement of the conveyor.

19. The system of claim 16 wherein the at least one automated cutting assembly includes a first automated cutting assembly for performing the first cut and a second automated cutting assembly for performing a second cut.

20. The system of claim 19 wherein the first automated cutting assembly includes a circular saw and wherein the second automated cutting assembly includes a band saw.

21. The system of claim 16 further comprising at least one of a support rail and a pressurized belt, both of which are configured for stabilizing the primal of meat on the conveyor.

22. The system of claim 16 further comprising an imaging system for determining a physical characteristic on the primal of meat.

23. The system of claim 22 wherein the physical characteristic on the primal of meat is a chine bone.

24. The system of claim 22 further comprising a control system for adjusting the at least one automated cutting assembly as a function of the physical characteristic on the primal of meat.

25. The system of claim 16 wherein the primal of meat is a forequarter and further includes a chuck, a chuck short ribs, and a brisket bone, and wherein the first cut separates the brisket bone from the chuck short ribs and the chuck, and a second cut separates the chuck short ribs from the chuck.

26. A system for separating a wing section of beef into a rib, a plate and a navel, the system comprising:
    a first end;
    a second end;
    a conveyor configured to move the wing section from the first end of the system to the second end of the system;

an orientation device to align the wing section on the conveyor;

an advancement device configured to contact a trailing edge of the wing section and prevent the wing section from moving in a direction opposite to a direction of movement by the conveyor; and a first automated cutting assembly configured to perform a first cut to separate the navel from the plate and the rib; and a second automated cutting assembly configured to perform a second cut to separate the plate from the rib.

27. The system of claim 26 wherein the first automated cutting assembly is a circular saw and wherein the second automated cutting assembly is a band saw.

28. The system of claim 26 wherein the orientation device is a protrusion that runs essentially a length of the conveyor, and the protrusion is configured to engage with a spinal groove on the wing section.

* * * * *